Jan. 1, 1963 S. H. VUNCANNON 3,071,219
AWNING WINDOW AND PARTS THEREOF
Filed Oct. 25, 1956 7 Sheets-Sheet 1
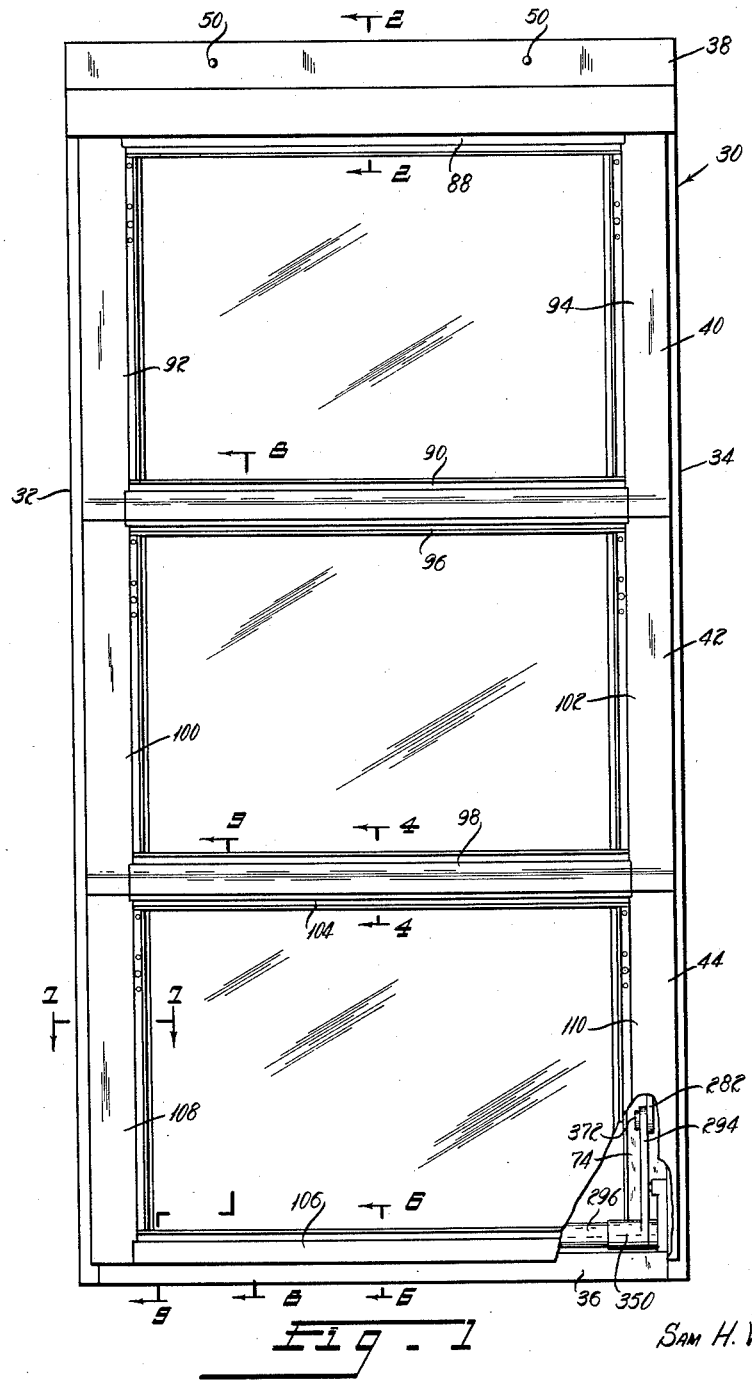
INVENTOR
SAM H. VUNCANNON
BY
ATTORNEYS

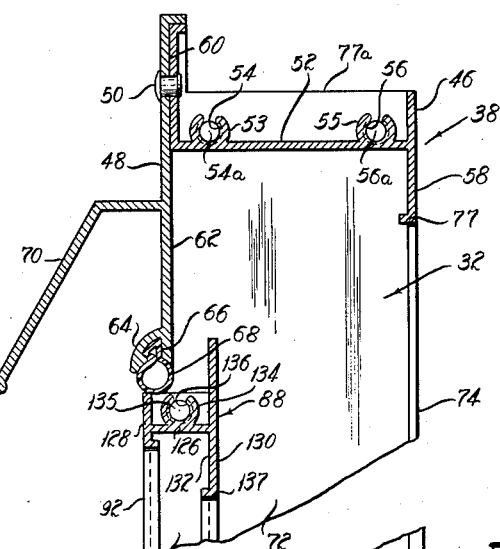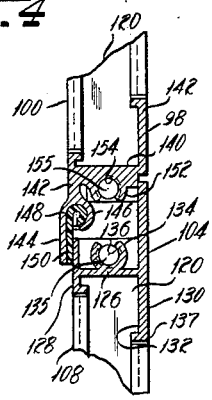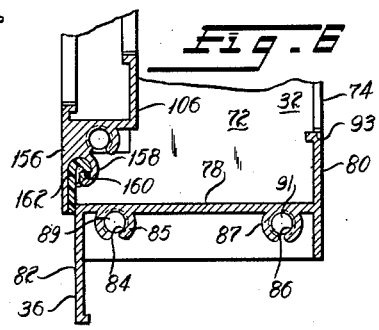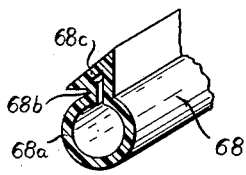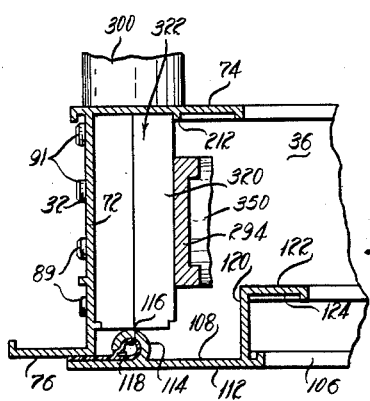

Jan. 1, 1963 S. H. VUNCANNON 3,071,219
AWNING WINDOW AND PARTS THEREOF
Filed Oct. 25, 1956 7 Sheets-Sheet 3
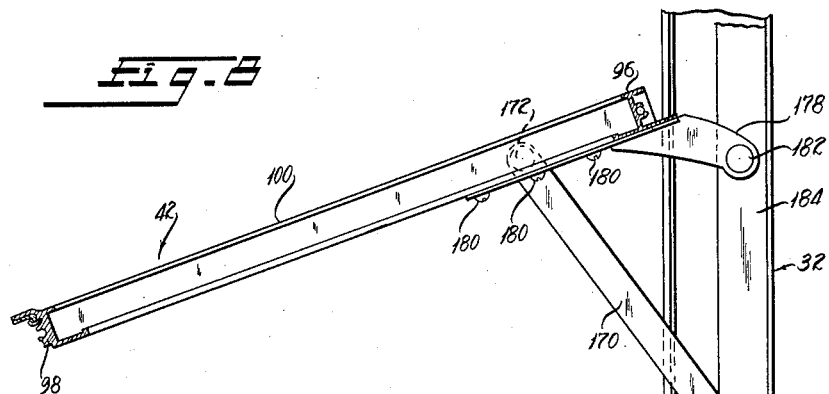
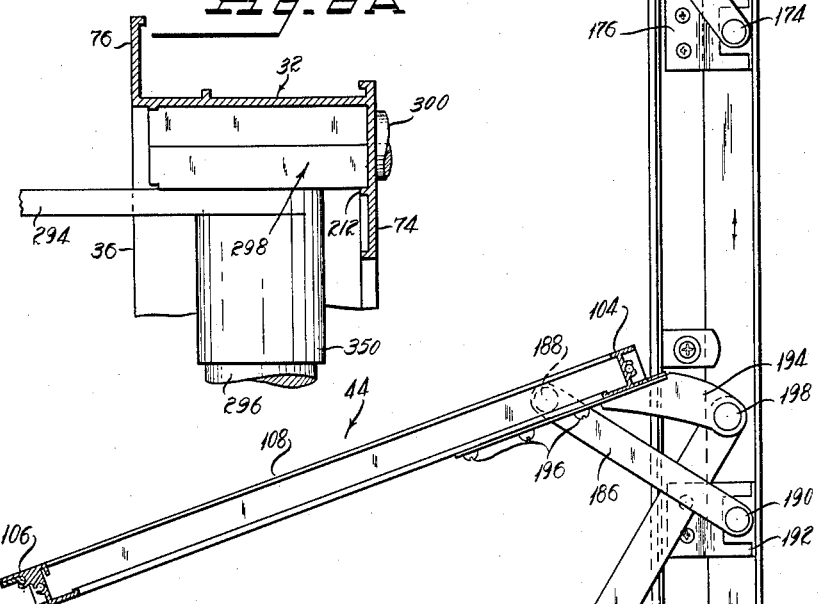
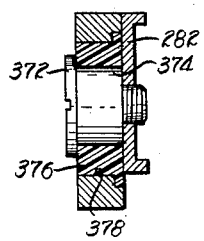
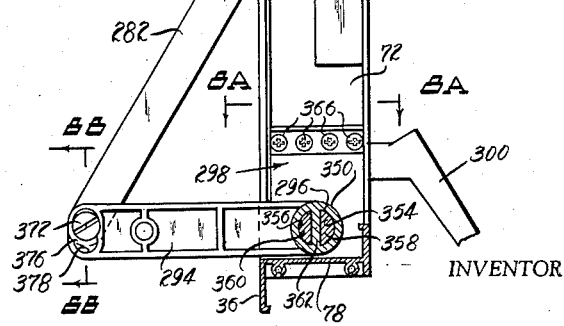
INVENTOR
Sam H. Vuncannon
BY
ATTORNEYS Jan. 1, 1963 S. H. VUNCANNON 3,071,219
AWNING WINDOW AND PARTS THEREOF
Filed Oct. 25, 1956 7 Sheets-Sheet 4
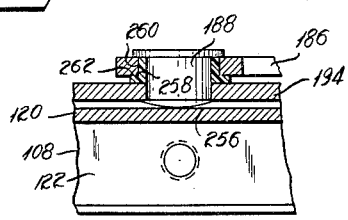
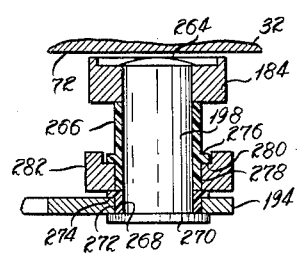
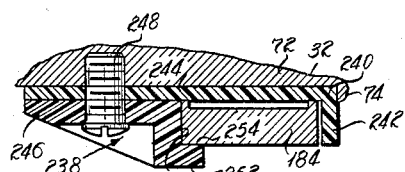
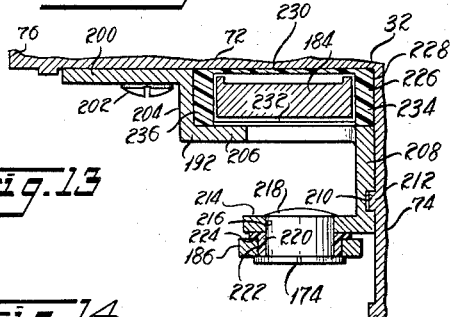
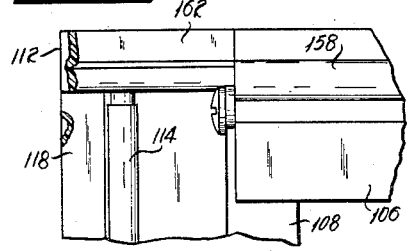
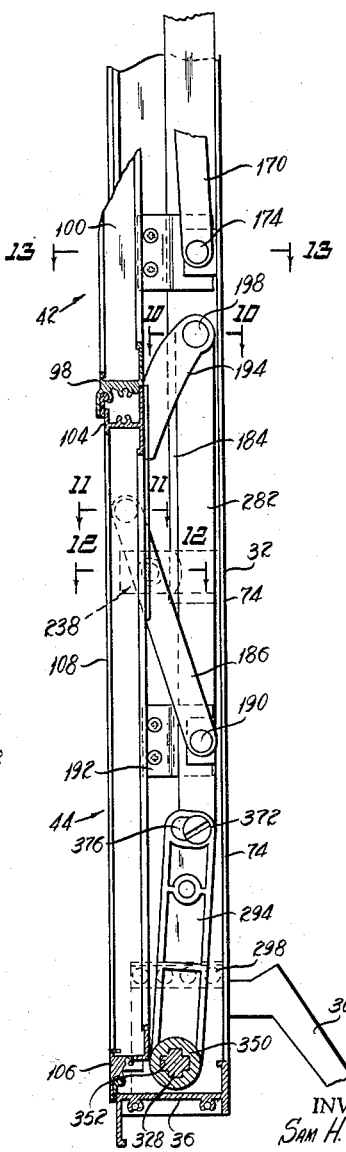
INVENTOR
Sam H. Vuncannon
BY
ATTORNEYS Jan. 1, 1963   S. H. VUNCANNON   3,071,219
AWNING WINDOW AND PARTS THEREOF
Filed Oct. 25, 1956   7 Sheets-Sheet 5
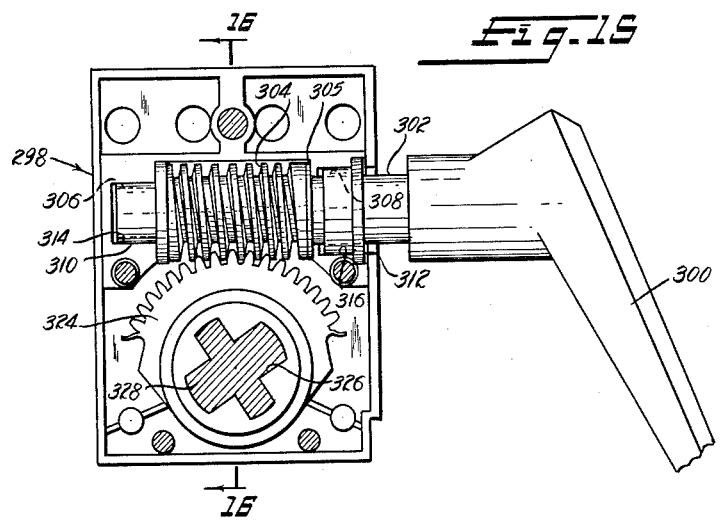
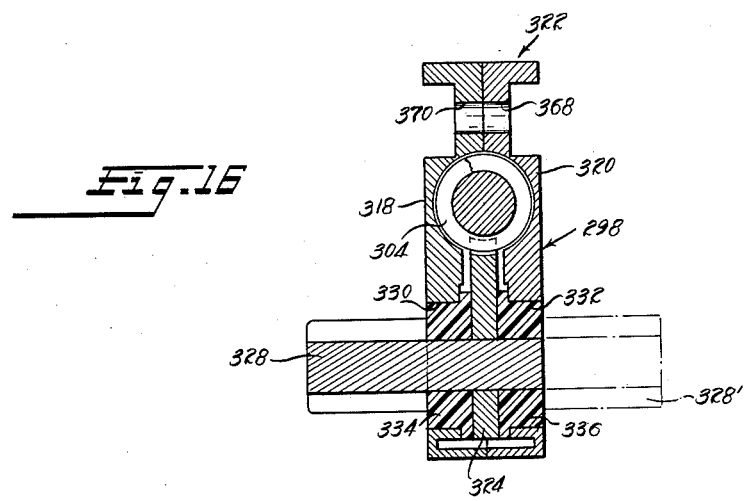
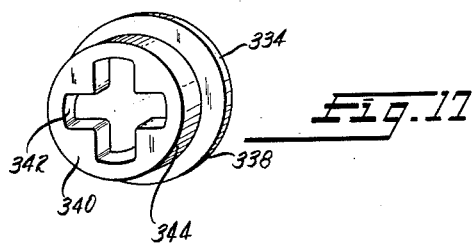
INVENTOR
SAM H. VUNCANNON
BY
ATTORNEYS

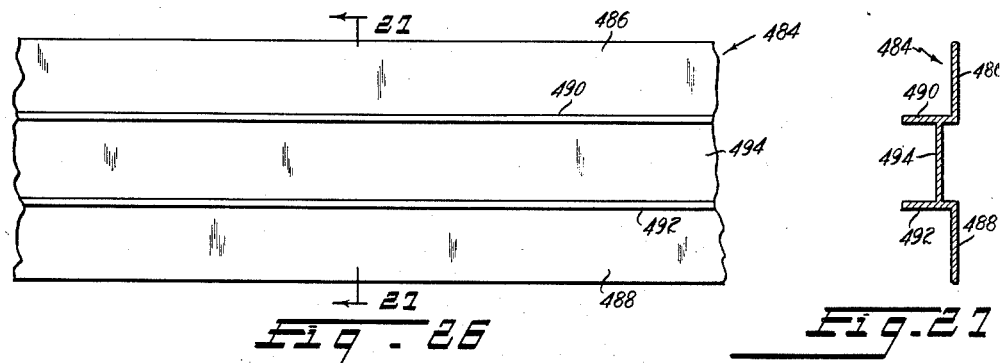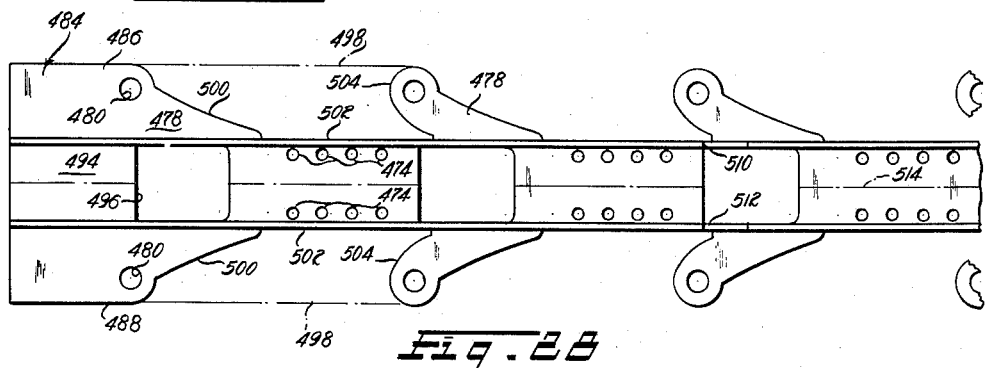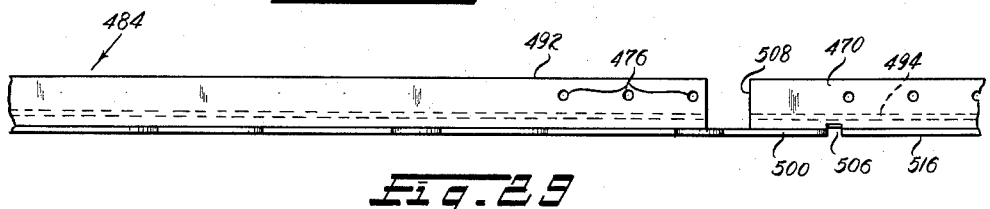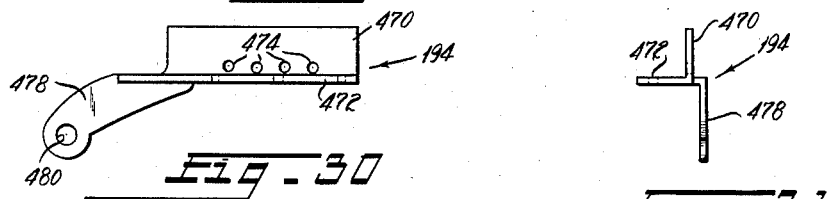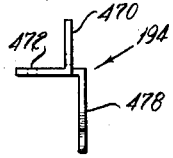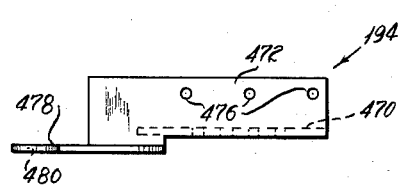

3,071,219
Patented Jan. 1, 1963

3,071,219
AWNING WINDOW AND PARTS THEREOF
Sam H. Vuncannon, Coral Gables, Fla., assignor to Vun-Russ Company, Inc., Hialeah, Fla., a corporation of New York
Filed Oct. 25, 1956, Ser. No. 618,358
11 Claims. (Cl. 189—67)

The present invention relates to improvements in awning type metal windows, sub-assemblies and parts thereof and more particularly to improvements in the framing, hinging, weather stripping, pivoting and operating mechanism for the sashes of such windows which reduce the cost of fabrication, facilitate installation and assure continued ease of operation and maintenance throughout the life of the window structure even when subjected to the influence of highly corrosive atmosphere as is encountered in the tropics or on islands. Heretofore there has been no metal window which was satisfactory for use on islands, as in the Pacific military and naval installations for example, or in the tropics because after the sashes had been left in any given position for any substantial period of time it became impossible to operate them. The moving parts had become frozen together due to the corrosive effect of the atmosphere. While this problem is less severe on the mainland and in more temperate climates, it is of importance in all humid areas.

From the installations standpoint, while awning type windows are ordered and sold for installation in building structures in predetermined sizes in which they are factory fabricated, due to the lack of close tolerances maintained in the construction of the openings in which the windows are to be mounted, it becomes necessary at times to make adjustments in the lateral dimensions of the window assembly. Since the tools available in field installation are few and simple, it is desirable that the window assembly be so constructed that, with the use of the most simple hand tools, such as the hack saw, the window can be adjusted to fit the opening in which it is to be mounted. In windows of this type, reducing the overall width of the window assembly requires the reducing of the lateral dimensions of not only the window frame and each of the sashes but also the operating mechanism and relocation of the fasteners securing these components together. Prior to the present invention, the lateral dimension of window assemblies could be made only after difficult and time consuming alterations of the operating mechanisms, usually requiring shop work rather than on the job adjustment.

In window assemblies of this type, a relatively complex operating linkage is necessary in order to effect opening and closing sash movements and each link must have an accurately predetermined movement and the deflection of the parts under load must be accommodated in order to effect full closure of the ventilators to provide a completely weather tight seal between the sashes and the frame. While such accurate movement of the sashes could be achieved with very accurately machined links of the operating mechanism and very accurate location of all sash pivots, such precision craftsmanship would render the cost of fabrication of windows of this type prohibitive. Heretofore inaccuracies in proper ventilator closure resulting from the accumulation of dimensional variations within predetermined tolerances and part deflection have either remained uncompensated leaving the window assembly not weather tight or been compensated by adjustments which, through use, can become out of adjustment. An example of such latter construction is found in United States Patent No. 1,987,516, issued January 8, 1935, to E. Peremi et al.

Pivoted sash windows are customarily made of light weight extrudible metal, usually aluminum or magnesium. It has been customary heretofore in the prior art to form all the bearing surfaces of these window assemblies with direct metal to metal contact. During use, particularly in humid tropical climates the abrasion caused by this metal to metal contact of the bearing surfaces coupled with periods in which the relatively moving parts are not operated results in corrosion of these parts and freezing of the moving parts together so that the sashes can no longer be operated between their open and closed positions. This is true despite the normal corrosion resistance of metals such as aluminum and magnesium.

In prior art pivoted sash windows, in order to fully close the sashes, the sash operating mechanism is cranked to the limit of its travel in the closing direction or remains under load to hold the ventilators closed unless an auxiliary locking mechanism is actuated to lock the window. This, in addition to straining the various pivots and reducing the life of the components of the assembly, results in loosening during use of the screw and bolt mountings for the various components. Loosening of these components permits them to move into positions in which they can jam during sash opening and closing operations and if the operating mechanism is forced, breakage of certain of the various lightweight parts will result.

With the foregoing general considerations of the prior art in view, the principal objects of the present invention are to provide in pivoted sash window assemblies:

(1) An improved operating linkage which is manipulatable to effect sash opening and closure movements and which in its closed sash position is free of strain and maintains the window in its locked position automatically;

(2) A sash operator which when in its closed sash position is self locking to prevent opening of the window from the exterior thereof;

(3) A sash operator which when it is in its closed sash position is self-locking and which embodies a lever-crank linkage movable under control of an operating mechanism through its dead center position during sash closure movement into abutment with a stop to prevent manipulation of the windows independently of such mechanism and to relieve such mechanism of strain;

(4) A frame, a sash pivoted on the frame, and an operating mechanism mounted on the frame and connected to the sash to effect opening and closing thereof in which the components of said frame, sash and mechanism which extend laterally across the assembly are of uniform cross section over at least a predetermined portion of their lengths at one end and detachably connected at such one end to the associated components whereby the lateral dimension of said assembly can be decreased merely by detaching such associated components, cutting off like amounts of each laterally extending component and reattaching such associated components to the remainder of the laterally extending components;

(5) A frame, a sash and an operating mechanism on said frame and connected to said sash and operable to move said sash between its openend and closed positions, such assembly being formed of extruded metal components and embodying means for eliminating metal to metal bearing contact between all relatively moving parts formed of extruded metal to prevent freezing of said components together when subjected to a corrosive conducive atmosphere.

(6) A pair of relatively movable extruded metal elements and an anti-friction bearing device interposed between said elements;

(7) A pair of relatively movable extruded metal elements and an anti-friction plastic bearing element interposed there between to prevent freezing together of such elements;

(8) An extruded metal frame element, an operating element mounted for translatory movement on said frame element and an anti-friction plastic bearing sleeve surrounding and supporting said operating element in spaced relation to said frame element;

(9) A first metal element and a second metal element supported by and pivotally movable relative to said first element, and an anti-friction plastic bushing interposed between said elements;

(10) An operating mechanism for moving the sashes between open and closed positions embodying a pair of pivotally connected links, one of said links having an elongated aperture formed therein at such pivot connection and supporting an aperture insert element and a pivot stud mounted in the aperture of said insert element whereby location of the pivot axis of said pivot stud relative to said one link can be shifted by replacement of said insert element with an insert element of the like external cross section and with the aperture therethrough offset from the location of said aperture in the insert element whereby the pivot axis between said links can be shifted to compensate for the variations within predetermined tolerances in the dimensions of and deflection under load of the components of said mechanism and assure weather tight closure of the sashes against the frame;

(11) An operating mechanism for moving the sashes between open and closed positions and embodying means adapted to effectively shift the connection between two links of said mechanism to compensate for variations within predetermined tolerances in the dimensions of and deflection under load of the components of said mechanism;

(12) An improved flexible deformable weather-strip construction forming a weather-tight seal between the top of a pivoted sash and a frame header member disposed adjacent the top thereof when said ventilator is in its closed position;

(13) An improved flexible deformable readily attachable weather strip for forming a weather tight seal about the margin of a pivoted metal sash frame;

(14) An improved sash operating mechanism which may be easily and economically fabricated, which is adapted to be mounted within the window frame at either side thereof for actuation of the sash operating linkage, and which is provided with anti-friction plastic bushings proxiding long operative life in corrosive conducive atmospheres; and

(15) An improved sash hinge and method of fabrication of such a hinge which permits mass production of such components.

These and other objects of the present invention will become more fully apparent by reference to the appended claims and as the following detailed description proceeds with reference to the accompanying drawings wherein:

FIGURE 1 is a front elevational view of a window assembling embodying the principles of the present invention and showing the pivoted sashes in their closed positions;

FIGURE 2 is a fragmentary sectional view taken substantially along the line 2—2 of FIGURE 1 illustrating the configuration of the header of the window frame and the cross sectional configuration of the top frame member of the sash;

FIGURE 3 is a perspective view of a weather strip element interposed between the header and the top edge of the upper sash;

FIGURE 4 is a fragmentary sectional view taken substantially along line 4—4 of FIGURE 1;

FIGURE 5 is a fragmentary perspective view of the weather strip element interposed between the sashes and the window frame;

FIGURE 6 is a fragmentary sectional view taken substantially along the line 6—6 of FIGURE 1;

FIGURE 7 is a fragmentary sectional view taken substantially along line 7—7 of FIGURE 1;

FIGURE 8 is a fragmentary view taken substantially along line 8—8 of FIGURE 1 and illustrating the configuration of the sashes and the sash operating mechanism with the sashes in their open positions;

FIGURE 8A is a fragmentary sectional view taken substantially along the line 8A—8A of FIGURE 8;

FIGURE 8B is a fragmentary sectional view taken substantially along the line 8B—8B of FIGURE 8;

FIGURE 9 is a fragmentary sectional view taken substantially along the line 9—9 of FIGURE 1 illustrating the sashes and the configuration of the sash operating mechanism when the sashes are in their fully closed positions;

FIGURE 10 is a fragmentary sectional view taken substantially along line 10—10 of FIGURE 9;

FIGURE 11 is a fragmentary sectional view taken substantially along line 11—11 of FIGURE 9;

FIGURE 12 is a fragmentary sectional view taken substantially along line 12—12 of FIGURE 9;

FIGURE 13 is a fragmentary sectional view taken substantially along the line 13—13 of FIGURE 9;

FIGURE 14 is a fragmentary plan view of the lower corner construction of the sashes of the window assembly of FIGURE 1 as viewed from the interior side of such window assembly;

FIGURE 15 is a lonigtudinal section through the window operating mechanism;

FIGURE 16 is a sectional view taken through the sash operating mechanism taken along the line 16—16 of FIGURE 15;

FIGURE 17 is a perspective view of the bushing for the worm wheel shaft of the operating mechanism of FIGURE 15;

FIGURE 26 is a fragmentary elevational view of the elongated extruded member utilized in the fabrication of the sash hinges of the assembly of FIGURE 1;

FIGURE 27 is a transverse sectional view taken substantially along line 27—27 of FIGURE 26;

FIGURE 28 is a plan view illustrating the successive stages of fabrication of the sash hinge from the member illustrated in FIGURE 26;

FIGURE 29 is a side elevational view of the structure shown in FIGURE 28;

FIGURE 30 is a side elevational view of the hinge as finally formed;

FIGURE 31 is an end view of the sash hinge as finally formed; and

FIGURE 32 is a front elevational view of the hinge as finally formed.

Figure 18:
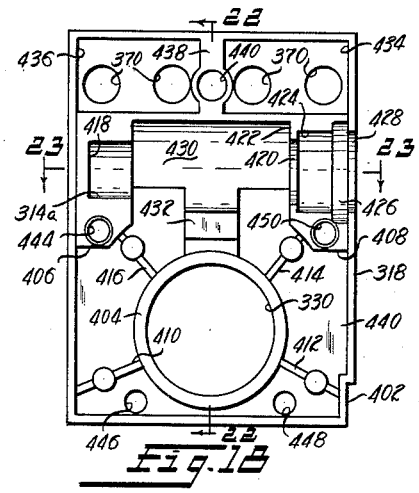
FIGURE 18 is an interior plan view of one of the housing halves for the operating mechanism of FIGURE 15.

Referring now to the drawings and particularly to FIGURE 1, the window assembly of the present invention comprises a generally rectangular window frame 30 comprising spaced parallel extruded jamb elements 32 and 34, a sill 36 extending between the bottoms of the jamb elements 32 and 34 and rigidly connected at its opposite ends thereto, and a header 38 similarly extending between and rigidly connected at its opposite ends to jamb elements 32 and 34, and a plurality of sashes 40, 42 and 44 each of which is pivotally mounted adjacent its top edge for pivotal movement relative to the frame about a horizontally extending axis between the closed position as illustrated in FIGURE 1 and in open position illustrated in FIGURE 8.

Referring to FIGURE 2, the header 38 is formed of a pair of extruded elements 46 and 48 rigidly connected by spaced rivets 50. Header element 46 is provided with a horizontally extending web portion 52 integrally formed on its top surface with longitudinally extending undercut bead formations 53 and 55 defining open sided screw receiving grooves 54 and 56. The opposite end faces of element 46 abut jamb elements 32 and 34. Element 46 is rigidly connected to the jamb elements 32 and 34 at its opposite ends by self tapping screws 54a and 56a extending through aligned apertures in elements 32 and 34 and threaded into grooves 54 and 56. At the opposite sides of web 52, element 46 is formed with an inner vertically extending face plate 58 and an outer vertically extending face plate 60 to which the header element 48 is attached in surface contact. The header element 48 has a vertically extending portion 62 terminating in an enlarged bead portion 64 formed with a longitudinally extending undercut groove 66 in which is mounted a hollow vinyl insert weather strip element 68 of the configuration shown in FIGURE 3. Header element 48 has a further outwardly extending and downwardly inclined portion 70 forming a drip plate to deflect water running downwardly from above the window assembly outwardly from the sashes 40, 42, and 44.

The weather strip 68 (FIGURE 3) is formed with a hollow thin walled tubular portion 68a, an upstanding neck portion 68b having parallel external side walls and a wedge shaped bead portion 68c adapted to be received in the undercut groove 66 in interlocked relation as shown in FIGURE 2.

The jamb elements 32 and 34 are each of the cross sectional configuration illustrated for element 32 in FIGURE 7. The jamb element 32 is an extruded element having a central vertically extending web 72 equal in width to the web 52 of the header element 46, an inner face plate portion 74 and an outer face plate portion 76. In assembly, the inner face plate portions 74 are cut away sufficiently at the top ends of elements 32 and 34 as indicated at 77 (FIGURE 2) to accommodate the ends of the header element 46 in abutment against the inner face of the web portion 72 of the jamb element 32. The top surface of the web portion 52 of the header element 46 lies sufficiently below the top edge 77a of the web portion 72 of the jamb elements 32 and 34 to accommodate the screws 53 and 55.

The cross sectional configuration of the sill 36 is illustrated in FIGURE 6 and comprises a web portion 78, of equal width to the web portions 72 of the jamb elements 32 and 34 and 52 of the header element 46 respectively, an inner face plate portion 80, and an outer face plate portion 82. The under surface of the web portion 78 is formed with longitudinally extending beads 85 and 87 formed with undercut longitudinally extending screw receiving grooves 84 and 86 for threadedly receiving the ends of self tapping screws 89 and 91 in the same manner as the grooves 54 and 56 as provided on the header element 46. The opposite ends of the sill 36 abut the webs 72 of the jamb elements 32 and 34 and are secured thereto by screws 89 and 91 extending through aligned apertures and threadedly received within the opposite ends of the grooves 84 and 86. The lower edge of the inner face plate portions 74 of the jamb elements 32 and 34 is cut away sufficiently as indicated at 93 to accommodate the end portion of the inner face plate portion 80 of the sill 36.

Referring to FIGURE 1, the three sashes 40, 42 and 44 are provided with generally rectangular hollow frames each supporting a suitable transparent window. The frame of top sash 40 is formed by top and bottom extruded elements 88 and 90 rigidly interconnected by extruded elements 92 and 94. The frame of sash 42 is formed by extruded top and bottom elements 96 and 98 rigidly interconnected by extruded side elements 100 and 102. The frame of the bottom sash 40 is formed by top and bottom elements 104 and 106 rigidly interconnected by side elements 108 and 110. The side elements 92, 94, 100, 102, 108 and 110 are each of the cross sectional configuration illustrated for element 108 in FIGURE 7. As is therein shown, these elements comprise an exterior face plate 112, formed on the interior surface with a longitudinally extending boss 114 having a groove 116 formed therein to receive a vinyl insert weather strip element 118 the configuration of which is best illustrated in FIGURE 5. Weather strip 118 has a flat portion 118a in surface contact with the outer edge region of the interior face of plate 112 and a longitudinally hollow bead portion 118b which snugly interfits in interlocking relation within undercut groove 116 as shown in FIGURE 7. In addition, side element 108 is formed with a vertically extending web portion 120 and an inner face plate portion 122 which define a recess 124 into which the edge of the window glass is received and glazed.

The top sash elements 88, 96 and 104 are each of the cross sectional configuration illustrated for element 104 in FIGURE 4 and for element 88 in FIGURE 2. As is therein illustrated, these elements are extrusions of uniform cross section and consist of a horizontally extending web portion 126, a vertically extending outer face plate 128 and a vertically extending inner face plate 130, which coact with the web 126 to form a window glass receiving notch 132. The upper surface of the web portion 126 is formed with a longitudinally extending boss 134 formed with a longitudinally extending groove 136. The dimensions of the walls forming the notch 132 are identical with the corresponding dimensions of the notch 124 of the side elements illustrated in FIGURE 7. In assembly, the top portion of the side elements 92, 94, 100, 102, 108 and 110 are cut away as indicated at 137 so that the opposite end faces of each of the top elements 88, 96 and 104 can be received in abutment against the inner faces of the webs 120 of those elements and those elements are rigidly connected to the top elements 88, 96 and 104 by self tapping screws 135 extending through suitably aligned apertures in the webs 120 and threadedly received into the grooves 136 of the bosses 134.

The bottom frame elements 90 and 98 of the sashes 40 and 42 are each of the cross sectional configuration illustrated for the element 98 in FIGURE 4. The bottom frame element 106 of the sash 44 is of the configuration illustrated in FIGURE 6. Referring first to FIGURE 4, the elements 90 and 98 each are formed with a web portion 140 interconnecting oppositely extending inner and outer face plate portions 142 and 144. Face plate portion 144 has a vertically extending horizontally offset extension 144' providing for overlap over the portion 128 of the top element 96 or 104 as shown in FIGURE 4. The outer face plate portion 142 is formed with a boss 146 having a longitudinally extending groove formed therein to receive a vinyl insert weather strip element 150 which is of identical configuration to that shown in FIGURE 5. When the sashes 40, 42 and 44 are in their closed position as shown in FIGURE 1, the weather strip element 150 on the bottom ventilator frame elements 90 and 98 abut the outer face plate portions 128 of the top ventilator frame elements 96 and 104 respectively to form a weather tight seal in the manner illustrated in FIGURE 4.

The bottom frame element 106 of the ventilator 144 is of the cross sectional configuration illustrated in FIGURE 6.

Referring to FIGURE 4, the web portion 48 of the bottom frame elements 90 and 98 are formed with integral longitudinally extending boss 152 formed with a longitudinally extending groove 154 to form a recess to receive at its ends self tapping screws. The bottom frame elements 90 and 98 are received between the side elements 92 and 94 and 100 and 102 respectively and are thereto by self tapping screws 155 received in the opposite ends of the grooves 154 thereof in the manner identical of that which has been described hereinbefore for the top elements 88, 96 and 104.

The bottom frame element 106 for the sash 44 is identical with the elements 98 and 90 described in reference to FIGURE 4 with the exception that its outer face plate 156 does not require a horizontally offset portion, the outer face plate being provided with a longitudinally extending boss 158 having a longitudinally extending groove 160 formed therein to receive a longitudinally vinyl insert weather strip element 162 of identical cross sectional configuration of the element 118 illustrated in FIGURE 5. When the sashes 40, 42 and 44 are in their closed position as illustrated in FIGURE 1, the weather strip element 162 abuts the exterior face of the outer face plate portion 82 of the sill 36 to form a weather tight seal therewith. The weather tight junction between the weather strips 118 and the strips 148 and 162 is illustrated in FIGURE 14.

The pivotal mounting of and operating mechanism for the sashes 40, 42 and 44 is best illustrated in FIGURES 8 and 9. Referring to FIGURE 8, the sash 42 is pivoted at its left hand end as viewed in FIGURE 1 to the jamb element 32 by a toggle linkage consisting of a link 170 (pivotally connected to the side frame element 100 of the sash 42 by a pivot stud 172 fixed on a flange of a hinge link 178 and to the jamb element 32 by a pivot stud 174 that is mounted in fixed relation to jamb element 32 by a mounting bracket 176) and by the hinge link 178 (fixed to frame side element 100 by screws 180 and which is pivoted by a stud 182 to a vertically extending operating slide bar 184). The sash 42 is pivoted to the jamb element 34 at its opposite edge by a similar linkage having pivots coaxial with the pivots of this linkage. As is apparent from the configuration of this linkage just described, upward movement of the operating bar 184 from the position shown in FIGURE 8 will produce upward movement of pivot stud 182, counterclockwise pivotal movement of the sash 42 relative to the link 170 about the axis of stud 172 and concomitant pivotal movement in a clockwise direction about the axis of pivot stud 174 of the link 170. This movement is effective to move the sash 42 inwardly (to the right as viewed in FIGURE 8) toward the jamb element 32 to its closed position as illustrated in FIGURE 9. The sash 40 is mounted between the jamb elements 32 and 34 by linkages which are identical with that which has just been described for the sash 42.

The sash 44 is mounted between the jamb elements 32 and 34 by toggle linkages at its opposite ends, each comprising a link 186 (pivotally connected to the side element 108 of the sash 44 by a pivot stud 188 fixed on an integral flange of a hinge link 194 and to the jamb element 32 by a pivot stud 190 which is fixed relative to the jamb element 32 by a mounting bracket 192) and by a link 194 (fixed by screws 196 to the side frame element 108 of the sash 44 and pivotally connected to the operating bar 184 by a pivot stud 198).

The detailed construction of the fixed pivots for the links 170 and 186 is illustrated in FIGURE 13 which is a horizontal section through the pivot 174. As is therein shown, the mounting bracket 192 has a first portion 200 which is in surface contact with the web 72 of the jamb element 32 and which is fixed thereto by a pair of screws one of which is shown at 202. Bracket 192 has a second portion 204 extending perpendicular to the portion 200, a third portion 206 extending parallel to the portion 200, a fourth portion 208 extending perpendicular to the portion 206 and formed with a bottom recess 210 which interlocks with a longitudinally extending boss 212 of rectangular cross section formed on the inner surface of the inner face plate portion 74 of the jamb element 32 to rigidly position the bracket 192, and an upstanding lug portion 214 which is spaced from and parallel to the portion 206 and which is apertured at 216 to receive the end of the pivot stud 190 for the link 186. Pivot stud 190 is riveted to portion 214 of bracket 192 as indicated at 218. An anti-friction bushing 220 formed of corrosion resistant anti-friction plastic such as nylon or Teflon and providing a radial bearing surface 222 and an axial bearing surface 224 is interposed between the link 186 and the pivot stud 190 to assure free pivotal movement of the link 186 with minimum friction, without galling or binding, and is effective to prevent link 186, stud 174 and portion 214 of bracket 192 from freezing together when subjected to a corrosive atmosphere without operation for extended periods.

The portions 204 and 206 of the bracket 192 coact with the portions 72 and 74 of the jamb element 32 to define a rectangular aperture 226 through which the operating bar 184 extends. A nylon or Teflon bearing sleeve 228 having side walls 230 and 232 and end walls 234 and 236 is fixed within this rectangular aperture 226 and provides a bearing for the operating bar 184 to assure its free sliding movement without freezing.

The operating bar 184 is provided with a further guide 238 above each of the lower pivots 190 for the sash 44 and above each of the lower pivots for the sash 42. These guides are of identical construction and are shown in cross section in the FIGURE 12. This guide consists of a nylon or Teflon angle guide member 240 having a short portion 242 interposed between the edge of the operating bar 184 and the inner surface of the inner face plate portion 74 of the jamb element 32 and a relatively long portion 244 interposed between the operating bar 184 and the web portion 72 of the jamb element 32. Angle member 240 together with a nylon or Teflon bearing block 246 is fixed to the web portion 72 of jamb element 32 by a screw 248. Guide block 246 has a bearing surface 250 and a projecting portion 252 providing a bearing surface 254 to coact with member 240 to fully confine the path of vertical sliding movement of the operating bar 184 without metal to metal contact between bar 184 and element 32.

The pivotal connection of the links 170 and 186 relative to the side sash frame members 100 and 108 respectively are illustrated in FIGURE 11 which is a cross sectional view through the pivot stud 188 for the sash 44. The pivot stud 188 is riveted to an upstanding portion of the hinge link 194 as indicated at 256 and a nylon or Teflon bushing 258 providing a radial bearing surface 260 and an axial bearing surface 262 is interposed between the link 186 and the pivot stud 188 to assure free pivotal movement without freezing together of these parts.

The pivotal connections of the hinge links 178 and 194 upon the operating slide bar 184 are illustrated in FIGURE 10, which is a fragmentary sectional view through the pivot stud 198 for the link 194. Pivot stud 198 is riveted to the operating bar 184 as indicated at 264 and is provided with a pair of nylon bushings 266 and 268 received on its shank between the head 270 of pivot stud 198 and the opposed face of the operating bar 184. Bushing 268 has a radial bearing surface 272 and an axial bearing surface 274 which receive the link 194 and provide for its free pivotal movement without freezing. Bushing 266 is provided with an annular projection 276 providing a radial bearing surface 278 and an axial bearing surface 280. Bushing 266 provides a pivot on operating bar 184 for an operating bar operating link 282, the purpose and operation of which we describe presently. Links 282 act only upon the studs 198 for the lower sash 44. In the corresponding pivot studs such as 182 for the sashes 42 and 40, a single bushing is provided on the pivot studs 182 for those sashes in lieu of the two bushings 266 and 268 provided on pivot studs 198. The construction of the pivots is otherwise identical.

In order to simultaneously pivotally shift the sashes 40 and 42 and 44 between their closed position illustrated in FIGURE 9 and their open positions illustrated in FIGURE 8, the operating bars 184 at each side of the window are lowered and in order to close the sashes 40, 42 and 44 the operating bars 184 are raised.

The simultaneous similar movement of each of the operating bars 184 at each side of sashes 40, 42 and 44 within jamb elements 32 and 34 is effected by a linkage consisting of link 282 which, as has been explained, is pivotally mounted relative to the bar 184 on the pivot stud 198, and a link 294 which is fixed for rotation to an operating cross shaft 296 which extends transversely across the window assembly above and parallel to the web 78 of the sill 36 and the axis of which is normal to the parallel paths of movement of the operating bars 184 in each of the jamb elements 32 and 34. Pivotal movement of the shaft 296 is controlled by a worm wheel operator assembly 298 connected at one end to the shaft 296; the detailed construction of which assembly 298 is shown in FIGURES 15 and 16 and is manipulated by a crank 300.

Referring to FIGURES 15 and 16, the crank 300 is fixed to a shaft 302 having a worm 304 formed integrally therewith and which is formed with cylindrical journal portions 306 and 308 at opposite sides of the worm portion 304. Journal portions 306 and 308 are rotatably received within nylon bearing bushings 310 and 312 respectively. The bushings 310 and 312 are received within cylindrical recesses 314 and 316 respectively which are defined by mating semi cylindrical recesses in the side walls of the mating halves 318 and 320 of the die cast housing 322. Worm 304 meshes with a segmental worm wheel 324 which is formed with an X-shaped internal spline aperture 326 through which an externally splined stub shaft 328 of X-shape cross section is received. Shaft 328 is journalled on the opposed housing halves within aligned apertures 330 and 332 in the opposed side walls of housing halves 318 and 320 by nylon bearing bushings 334 and 336, the configurations of which are identical and most clearly illustrated in FIGURE 17.

Referring to FIGURE 17, bushings 334 and 336 have a flanged portion 338 and a hub portion 340 and are formed with a through splined aperture 342 of identical X-shaped cross section to the cross section of the shaft 328. The cylindrical surfaces 344 of the bushings 334 and 336 are received in bearing contact within the aligned apertures 330 and 332 of the housing halves 318 and 320 to provide journals for the stub shaft 328 and the segmental worm wheel 324 supported thereby. By this construction rotation of the crank 300 in one direction will produce clockwise rotation of the shaft 328 and opposite rotation of the crank 300 will produce counter clockwise rotation of the stub shaft 328. It will be noted by reference to FIGURE 16 that the stub shaft 328 can be shifted from its position shown in FIGURE 16 to the dotted line position shown at 328' so that the operating assembly 298 can be adapted to coact with a operating shaft 296 either from the right hand end or the left hand end of that shaft merely by sliding the stub shaft 328 through the bushing 334 and 336 in the segmental worm wheel 324. This is of importance in that the same worm wheel operating mechanism can be used for window assemblies in which the operating crank 300 is to be located at the lower left or lower right of the window assembly.

Referring to FIGURE 9, the links 294 at each side of the window assembly are formed at their lower ends with hubs 350 which project toward the center of the window assembly and which have an end recess 352 of X-shaped cross section identical with the shaft 328 formed therein from the opposite sides of link 294 adjacent jamb elements 32 and 34. The projecting end of the shaft 328 on which the worm wheel 324 is mounted extends into this end recess in the adjacent one of the links 294 to form a spline connection between the stub shaft 328 and the hub 350 of that link 294.

At the ends of hubs 350 for links 294 adjacent the center of the window assembly, they are formed with a pair of diametrically opposed like segmental cylindrical end recesses 354 and 356 into which project similarly formed axial projections 358 and 360 formed on the end of the solid shaft 296 to provide a spline connection between shaft 296 and each link 294. Projections 358 and 360 are formed by cutting a diametral slot 362 across the opposite ends of shaft 296. Slots 362 are of sufficient predetermined depth that if it is desired to reduce the width of the window assembly a portion of projections 358 and 360 can be cut off while still providing a spline connection. If desired, shaft 296 can be splined over its entire length to mate with complementary recesses in links 294.

The operator assembly 298 is fixed to the jamb element 32 in abutment with the web 72 thereof and in abutment with the web 78 of the sill 36 being fixed in position by screws 366 extending through apertures 368 and 370 formed through the housing halves 318 and 320 as shown in FIGURE 16 and threaded into aligned apertures in the web 72 of jamb element 32.

The opposite end of shaft 296 (the right end as viewed in FIGURE 1) is formed similarly to that illustrated in FIGURE 8 and is received within the hub of a link 294 which is journalled by a nylon bushing in a pillow block (not shown) similar to one of the housing halves 318 or 320 attached to the web 72 of the jamb element 34.

Referring again to FIGURES 8 and 9, the links 282 and 294 are pivotally connected by a stud 372 which is threaded into a tapped hole in the end of link 282 and which passes through an aperture 374 formed in an elongated Teflon or nylon insert member 376 received in an elongated aperture 378 through the end of the link 294. Insert member 376 is removable and may be replaced by one of several like inserts having their apertures offset from the center of the larger dimension of insert 376 by varying amounts. This provides a control for the relative positions of links 282 and 294 at each side of the window assembly is utilized primarily to assure complete weather tight closure of the sashes by compensating for variation within predetermined tolerances in the dimensions of the parts of these linkages and by compensating for angular deflection under load of the cross shaft 296 between its driven end to which operator 298 and one of the window operating linkages is coupled and its opposite end to which the other of the window operating linkages is coupled.

It will be noted from FIGURE 9 that in the fully closed position of the sashes 40, 42 and 44, the axis of the pivot stud 372 is to the right of the dead center position in the plane defined by the axis of pivot stud 198 and the shaft 296 and that the link 282 is in abutment with inner face portion 74 of the jamb element 32 by this construction. If the sashes are not in complete weather tight engagement with the operating linkage in this position, insert 376 is replaced by an insert the aperture 374 of which is so located as to shift the pivot stud 372 more closely to its dead center position to force the sashes into firm weather tight relation with the window frame. This construction provides a self locking window because, if someone should try to open the window from the outside by grasping the edge of the sashes 40, 42, or 44, it will be found to be impossible to open the sashes when the link 294 is in its fully closed position as shown in FIGURE 9 because the application of a force on the sash 44, for example, to attempt to pivot in a clockwise direction to its open position will apply a downward directed force through stud 198 to the link 282. This is effective only to apply a further clockwise directed torque to the link 294 and force the link 294 and link 282 into more firm contact with the inner face plate portion 74 of the jamb element 32. It is, therefore, impossible to open this window assembly except by manipulation of crank 300. When links 282 and 294 are in this locked position, all load on the worm wheel mechanism is relieved.

The rotation of the crank 300, in normal operation of the window, will cause link 294 to rotate in a counter clockwise direction as viewed in FIGURES 8 and 9, shifting pivot stud 372 over the dead center position in which its axis is co-planar with the plane defined by the axes of pivot stud 198 and shaft 296 to its open position as illustrated in FIGURE 8. The nylon insert 376 functioning not only as a bearing assuring the prevention of freezing between the links 282 and 294 in the pivot stud 372 but also providing sufficient resiliency to permit these links to move over that dead center position while using a relatively close tolerance fit between stud 372 and insert element 376.

Referring to FIGURES 18 to 25, the housing halves 318 and 320 of the housing 322, for the worm wheel power drive assembly 298 are die castings. The configuration of the housing half 318 is shown in FIGURES 18, 20, 22 and 23. The lower portion of housing half 318 is formed with a side wall 400 having a marginal perpendicularly extending flange 402 defining bottom, top and end walls and a perpendicularly extending cylindrical boss 404 surrounding and defining the aperture 330 which receives the bushing 334 as shown in FIGURE 16. The boss 404 is reinforced by ribs 410, 412 and 416 of substantially equal height to the boss 404 extending from the marginal flange 402 and from the integral boss formation 406 and 408. The upper half of the housing 318 is formed with a semi-cylindrical recess 314 a terminating in an end wall 418, a coaxial semi-cylindrical recess 420 providing a radially extending surface 422 for absorbing the axial thrust received through the thrust bearing washer 305 shown in FIGURE 15 and coaxial semi-cylindrical recesses 424, 426 and 428. Recesses 424 and 426 receive the hub and flange of bushing 312 as shown in FIGURE 15 and the recess 428 provides an opening through which the shaft 302 of the worm 304 projects. A segmental cylindrical recess 430 is formed in the housing half 318 to accommodate the worm 304 and is in coaxial alignment with the recesses 314a, 320, 234 and 326. An upstanding bearing pad on boss 432 is provided between the recess 330 to confine the path of movement of the segmental worm wheel 324 and absorb any axial thrust force imparted thereto which is not absorbed by the flanges 338 of the bushing 334. The topmost portion of the housing half 318 is formed with generally rectangular recesses 434 and 436 in the end walls of which are formed the screw receiving apertures 370 and which are separated by a transverse rib 438 having an aperture 440 formed therein.

Figure 19:
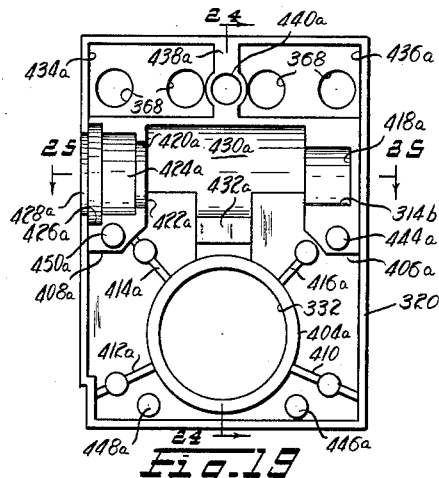
FIGURE 19 is an interior plan view of the other housing half for the operating mechanism of FIGURE 15.
Figure 20:
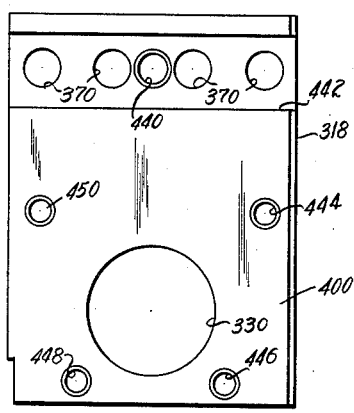
FIGURE 20 is an elevational view showing the reverse side of the housing half of FIGURE 18.
Figure 21:
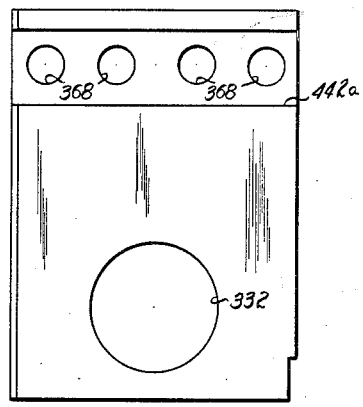
FIGURE 21 is an elevational view illustrating the reverse side of the housing half shown in FIGURE 19.
Figures 22, 23:
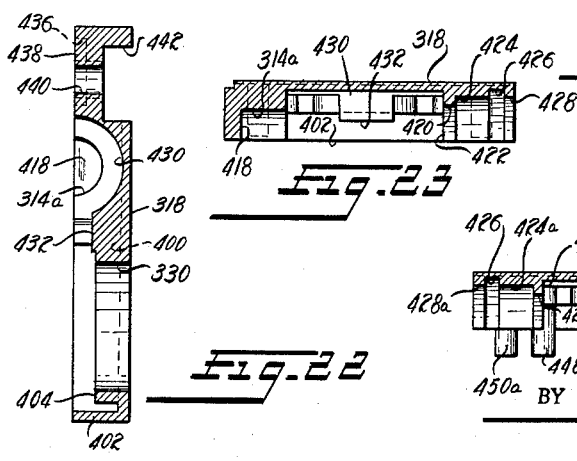
FIGURE 22 is a sectional view taken substantially along line 22—22 of FIGURE 18.
FIGURE 23 is a sectional view taken substantially along line 23—23 of FIGURE 18.
Figures 24, 25:
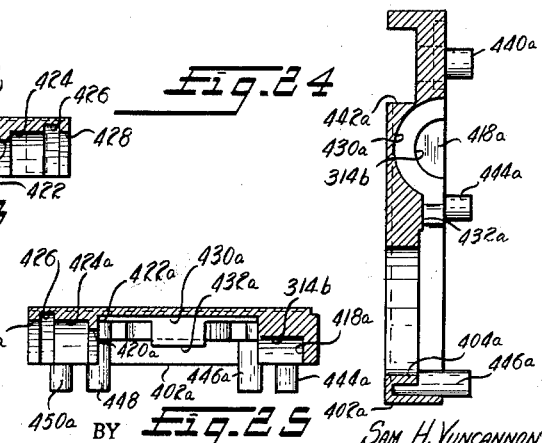
FIGURE 24 is a sectional view taken substantially along line 24—24 of FIGURE 19.
FIGURE 25 is a sectional view taken substantially along line 25—25 of FIGURE 19.

As is shown in FIGURE 22, the exterior face of the member 318 is formed with a transverse slot 442 which is intended to receive the heads of the mounting screws 366 (FIGURE 8) in recessed relation. In addition to the through aperture 440 the housing half 318 is formed with suitably spaced apertures 444, 446, 448 and 450 which are adapted to receive the integrally formed rivets 440a, 444a, 446a, 448a and 450a on the housing half 320 as is shown in FIGURE 19. Assembly of the two housing halves is effected by assembling the worm 304, washer 305, bushings 310 and 312, worm wheel 324 and bushings 334 and 336 on one housing half, such as half 318, placing the complementary housing half 320 over housing half 318 so that the rivets 440a, 444a, 446a, 448a and 450a project through the corresponding apertures 440, 444, 446, 448 and 450 and with the housing halves rigidly clamped together spinning over the ends of those rivets to form a rigid permanent assembly.

The housing half 320 is in all respects complementary to the housing half 318 having corresponding parts located in what is in effect a mirror image of the parts of the housing half 318. The corresponding portions of the housing half 320 have been assigned the same reference numerals as the parts of the housing half 318 with the suffix a. It is believed with this explanation further detailed description of that housing half is unnecessary.

The method of fabrication of the hinge links 178 and 194 by which the sashes 40, 42 and 44 are pivoted to the operating bar as shown in FIGURES 8 and 9 will be described in detail in reference to FIGURES 26 to 29 the detailed structure of those hinges being shown in FIGURES 30 to 32. Referring to FIGURES 30 to 32 the hinges 194 have an angle portion defined by mutually perpendicular plate portions 470 and 472. Portion 470 is the portion to which pivots 172 and 188 are fixed and is provided with suitable spaced apertures at 472 into any one of which pivots 172 and 178 may be riveted. Holes 472 in portion 472 are adapted to receive screws 180 and 196 for attachment of hinge links 178 and 194 to the side frame elements of the sashes 40, 42 and 44. A projecting portion 478 parallel to but offset from portion 470 and suitably apertured at 480 to receive pivots 182 and 198 provides a hinge connection to the operating bar 184 as is fully shown in FIGURE 8. The link illustrated in FIGURES 30 to 31 is for the left hand side of the window assembly as viewed in FIGURE 1. The corresponding links on the right hand side of the window assembly as viewed in FIGURE 1 are complementary in form to the illustrated link.

These links are stamped from an aluminum extrusion 484 the cross sectional configuration which is illustrated in FIGURE 27 in which is illustrated in the top plan view in FIGURE 26. This extrusion consists of co-planar laterally extending flanges 486 and 488, perpendicularly projecting ribs 490 and 492 which are interconnected by a web 494 parallel to the flange portions 486 and 488.

The extrusion 484 is fed intermittently through a work station a distance equal to the length of the hinge and is subjected while at rest to a two stage blanking operation as illustrated in FIGURE 28. In the first stage, apertures 474 and a large aperture 496 are stamped through the web 494, apertures 480 are stamped through the web 486 and 488 and a portion 498 is defined by the edges 500, 502, and 504, is removed from each of the webs 486 and 488. The edge 504 forms a trailing edge of the hinge portion 478 and the edge 500 forms a leading edge of that portion 478. In the second blanking stage, the extrusion 484 is subjected to the effect of blanking punches in the first blanking stage, and in this operation the apertures 476 are formed through the ribs 490 and 492 and a notch 506 is formed through the ribs 492 and 490 below the web 494 and immediately in front of the edge 500 and a further notch 508 is formed through each of the ribs 490 and 492 to define the trailing edge of the portion 470 of the first form link 194 and the trailing edge of the portion 470 of the next successive pair of links 194 to be formed. While the first and second blanking stages are occurring simultaneously, the second stage is being performed on a portion of the extrusion 484 which has already been subjected to stage one.

After these two blanking operations, the links 194 may be snapped off from the extrusion 484 at the thin sections 510 and 512 and then severed along the center line 514 of the extrusion 484. At this point the links 194 are practically completely formed, the only remaining operation to be performed is the removal of the portion 516 (FIGURE 28) of the rib 492 below the web 494. This portion 516 is removed by feeding the links 194 individually to a punch press to shear off the portion 516 and thus produce a completed link as illustrated in FIGURES 30 to 32.

With the exception of the worm 304, the worm wheel 324, and the thrust bearing 305 which are formed of suitable ferro metallic material such as steel and of the housing parts 318 and 320, and links 294 which are die cast, all metal parts of the window assembly are formed of a suitable light weight extrudable metal such as aluminum or magnesium, aluminum being preferred.

The bushings and sleeves referred to herein as made of nylon or Teflon are preferably all made of nylon due to its properties but may be made of any suitable antifriction plastic or thermal plastic material which will not permit freezing together of the parts when the assembly is subjected to the effect of corrosive atmosphere over extended periods of time.

Any of the conventional plastic materials or thermo plastics may be used as well as Teflon (tetrafluoroethylene) and Kel-F (trifluorochloroethylene) without departing from the concepts of the present invention in its broadest aspects so long as the composition formulations are such as to assure the necessary wear properties and ductility for such usage. This application is a continuation-in-part of my copending application Serial No. 515,881 filed June 16, 1955, for Window Assembly, now Patent No. 2,926,397, issued March 1, 1960.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A window assembly comprising a window frame having vertically extending metal jamb members and interconnecting sill and header members, a sash frame mounted between said jamb members for movement between an open position angularly related to said window frame and a closed position flush with said window frame, a pair of operating bars, one mounted for vertical sliding movement on each of said jamb members, means so connecting said operating bars to said sash member that movement of said bars in opposite direction imparts opening and closing movement to said sash frame, means for imparting simultaneous like movement to said operating bars, said means comprising a cross shaft extending between said jamb members adjacent said sill, a manually manipulatable worm wheel drive for said cross shaft, and a rigid link lever-crank mechanism at each end of said cross shaft and connecting said cross shaft to one of said operating bars, each said lever-crank mechanism embodying a resilient connection between the lever and the crank thereof and being moved through its dead center position during sash opening and closing movements by compression of said resilient connection and being on one side of said dead center position in its closed position and on the opposite side of its dead center position in its open sash position, compressible weather stripping compressed between overlapping portions of said sash and each of said members when said sash is in its closed position, stop means for establishing a limit of travel of each of said lever-crank mechanisms at its sash closed position whereby said sash is movable from its closed position only by manipulation of said worm wheel drive and said weather stripping is compressed in weather tight relation between said overlapping portions of said sash and said members, each said lever crank mechanism comprising a rigid crank member fixed to said cross shaft, a rigid lever member pivoted to said operating bar, and a pivotal connection between said members, one of said members having an aperture formed therethrough parallel to the axis of pivotal movement of such one member and elongated in a direction normal to such axis, an apertured resilient plastic insert mounted on said one member in said aperture and providing the resilient member of said resilient connection, and a pivot stud rotatably received in the aperture of said insert and fixed to the other of said member.

2. In a window assembly, a frame defining a window opening, a sash pivotally mounted relative to said window frame for movement between open and closed position, a multiple link operating mechanism carried by said frame and connected to said sash to impart opening and closing movements thereto, said operating mechanism including first and second members and means pivotally connecting said members and adapted to compensate within predetermined limits for variations in the dimensions of the links of said mechanism, said last named means comprising means defining an aperture in one of said members, a removable aperture insert fixed in said member aperture against rotation, and a pivot pin journalled in said insert aperture and fixed to the other of said members.

3. The combination defined in claim 2 wherein the center of the insert aperture is offset from the center of the member aperture by a pre-determined amount sufficient to compensate for the tolerance variations within predetermined tolerances in the dimensions of the lengths of said mechanisms.

4. In a metal window assembly having a window frame embodying spaced jamb members interconnected by header and sill members, a sash frame embodying spaced side members connected by top and bottom members and mounted on said window frame for movement between opened and closed positions, and an operating mechanism mounted on said window frame and operatively connected to said sash frame and embodying a splined cross shaft mounted between said jamb members adjacent said sill for oscillatory movement, operating linkages extending along each jamb member and drive connected to said sash frame and spline connected to said cross shaft, operating means for said drive shaft, said header, sill and sash frame top and bottom members having one element of a separable attachment means formed integrally therewith and extending over at least a predetermined portion of the entire length thereof, whereby the spacing between the said jamb members may be reduced merely by cutting off like amounts from the lengths of said header, sill, sash frame top and bottom members and cross shaft.

5. An antifriction, swing vane, mechanically operable, self-locking, weather-tight window assembly comprising a window frame having vertically extending metal jamb members and interconnecting metal sill and header members defining a window opening; a plurality of cooperating swing vanes having frames pivotally mounted between said jamb members for swinging movement between open positions angularly related to said window frame and edge overlapping closed positions flush with each other and said jamb and sill members and closing said window opening; compressible synthetic plastic sealing strips mounted in interlocked relation on the faces of said sash frames along the bottom and opposite ends of said swing vane frames in position to engage and form a weather-tight seal between the overlapping portions of said swing vane frames and between said swing vane frame ends and said window frame members when said swing vanes are in their closed positions, deformable bulbous synthetic plastic seal stripping depending from said header to engage the edge of the adjacent upper swing vane frame member to form a weather-tight seal between said header and said uppermost swing vane when said swing vanes are in their closed position; a pair of operating bars; mounting and guide means respectively mounting one of said bars for vertical sliding movement on each of said jamb elements; means so pivotally connecting said swing vanes to said operating bars that conjoint movement of said bars in one direction imparts opening movement to said swing vanes and in the opposite direction imparts closing movement thereto; means for imparting conjoint slide movement to said operating bars, said means comprising a cross-shaft extending between said jamb members adjacent said sill, crank lever mechanisms at each end of said cross-shaft respectively connecting said cross-shaft to said operating bars and each having a resiliently compressible pivot and adapted to be moved by compression of said pivots through their dead center position during sash opening and closing movements and effective during such closing movement through dead center to impart compression to said sealing strips and said bulbous seal stripping; a manually manipulatable encased self-locking worm gear and pinion drive unit for said cross-shaft mounted internally of said window frame at the junction of said sill member with one of said jamb members and having a worm gear driven output coupler member projecting from the casing thereof toward the other of said jamb members and interfitting in drive relation with one end of said cross-shaft and operating, due to the self-locking worm gear and pinion drive unit, to restrain said swing vanes against opening or closing movement under influence of forces applied to said swing vanes; stop means engaged by said crank lever connections to said operating bars for establishing a limit of travel of said worm drive unit and said crank lever mechanisms at their sash closed positions; and means to lock and prevent forced opening of said swing vanes and to maintain the compression on said sealing strips and bulbous stripping and assure such weather-tight sealing; and plastic, non-metallic pivot and slide bearing means supporting the worm and worm wheel of said worm wheel drive unit, said cross-shaft, said sash frame pivots, said operating bar mounting and guide means and said lever crank mechanism pivots and isolating said relatively movable parts from metal to metal contact thereby assuring corrosion and friction free efficient transmission to said sash frames of the drive torque applied to said worm wheel mechanism during manipulation thereof.

6. The combination defined in claim 2 wherein said insert is formed of an anti-friction plastic consisting of nylon.

7. The combination defined in claim 2 wherein said insert is formed of an anti-friction plastic consisting of Teflon.

8. In combination with a pivoted vent type window assembly having a frame defining an opening, a plurality of vents pivoted on the frame for movement between open positions spaced from the frame and closed positions in which said vents overlap and overlap the sides of said frame to close the opening of said window, and compressible weather stripping interposed in compressed weather-tight relation between the overlapped surfaces of said vents and frame when said vents are in their closed position; a rigid link self-locking operating mechanism comprising an operating member mounted for reciprocation relative to said frame, a rigid link pivotally interconnecting each of said vents to said operating member, a manually actuated worm and worm wheel operator, and a rigid link toggle mechanism interconnecting the worm wheel of said operator to said operating member to impart reciprocating movements thereto, said toggle mechanism having a resiliently compressible pivot and a dead center position through which it passes near by compression of said pivot the end of its vent closing movement at which position said weather stripping is under its maximum compression, a stop on said frame engaged by said mechanism after said mechanism passes through its dead center position in the vent closing direction to prevent further movement of said mechanism in said direction and positioned to engage said linkage while said weather stripping is under sufficient compression to maintain a weather-tight seal between said frame and said vents.

9. In an awning window structure, a frame, a bar reciprocally mounted on the frame, a plurality of antifriction plastic bearings surrounding said bar at spaced intervals along the path of movement thereof and supporting said bar in spaced relation from said frame, a sash, and means including a link operatively connected between the sash and bar for swinging the sash in and out incident to the movement of the bar, said bar being of generally rectangular cross-section, at least one of said plastic bearings being a one-piece molded plastic element having a rectangular opening therethrough defined by spaced parallel relatively thick side walls coextensive in length with the length of said one element and interconnecting parallel walls spaced in offset relation longitudinally of said rectangular opening.

10. In an awning window structure, a frame, a bar reciprocally mounted on the frame, a plurality of antifriction plastic bearings surrounding said bar at spaced intervals along the path of movement thereof and supporting said bar in spaced relation from said frame, a sash, and means including a link operatively connected between the sash and bar for swinging the sash in and out incident to the movement of the bar, at least one of said bearings comprising first and second one-piece molded plastic members, one of said plastic members having a flat base and a flange extending perpendicular from said base at one end thereof, the other of said plastic members having a flat base, a perpendicular flange at one end of its base and a further flange parallel to said base at the end of the first said flange remote from said base, said members being assembled together so that said one member end flange and a portion of its base coact with said other member flanges to define a rectangular opening for said bar.

11. In an awning window structure, a frame, a bar reciprocally mounted on the frame, a plurality of antifriction plastic bearings surrounding said bar at spaced intervals along the path of movement thereof and supporting said bar in spaced relation from said frame, a sash, and means including a link operatively connected between the sash and bar for swinging the sash in and out incident to the movement of the bar, said sash swinging means including a manipulatable operator and a lever-crank mechanism operatively connected between said operator and said bar, the lever of said mechanism being pivotally connected at its opposite ends to said bar and to the crank of said mechanism respectively by pivot studs extending through an aperture in an end of said lever and an aligned aperture in an adjacent portion of said crank and bar respectively and fixed in one of said apertures, and a one-piece molded plastic bushing surrounding each said stud with the other aperture of said aligned pair of apertures providing a radial bearing and having a radially extending flange isolating said lever from said crank and said bar.

References Cited in the file of this patent

UNITED STATES PATENTS

| | | |
|---|---|---|
| 1,505,029 | Kellerman | Aug. 12, 1924 |
| 1,903,059 | Meininghaus | Mar. 28, 1933 |
| 1,929,836 | Brown | Oct. 10, 1933 |
| 1,998,301 | Atwood | Apr. 16, 1935 |
| 2,004,810 | Hines | June 11, 1935 |
| 2,236,315 | Gray | Mar. 25, 1941 |
| 2,536,920 | Duncanis | Jan. 2, 1951 |
| 2,622,672 | Thomas | Dec. 23, 1952 |
| 2,637,547 | Schottenberg | May 5, 1953 |
| 2,666,677 | Miller | Jan. 19, 1954 |
| 2,674,451 | Tracy | Apr. 6, 1954 |
| 2,694,238 | Jones | Nov. 16, 1954 |
| 2,730,908 | Chillson | Jan. 17, 1956 |
| 2,736,403 | Gwynne | Feb. 28, 1956 |
| 2,767,813 | Blanchard | Oct. 23, 1956 |
| 2,787,032 | Brenner | Apr. 2, 1957 |
| 2,797,929 | Herbenar | July 2, 1957 |
| 2,814,538 | Connolly | Nov. 28, 1957 |
| 2,828,668 | De Angelis | Apr. 1, 1958 |
| 2,829,744 | O'Brien | Apr. 8, 1958 |
| 2,846,251 | Herbenar | Aug. 5, 1958 |

FOREIGN PATENTS

| | | |
|---|---|---|
| 583,577 | Great Britain | Dec. 20, 1946 |

UNITED STATES PATENT OFFICE
CERTIFICATE OF CORRECTION

Patent No. 3,071,219 January 1, 1963

Sam H. Vuncannon

It is hereby certified that error appears in the above numbered patent requiring correction and that the said Letters Patent should read as corrected below.

Column 2, line 59, for "openend" read -- opened --; column 4, line 26, for "lonigtudinal" read -- longitudinal --; column 7, line 46, for "comitant" read -- commitant --; column 10, line 43, after "assembly" insert -- and --; column 12, line 47, after "punches" insert -- operating in a path normal to the path of the blanking punches --; column 14, line 19, strike out "tolerance".

Signed and sealed this 1st day of October 1963.

(SEAL)
Attest:

ERNEST W. SWIDER

Attesting Officer

DAVID L. LADD

Commissioner of Patents